Figure 7:
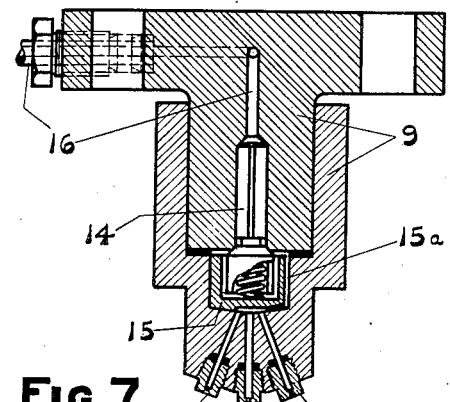

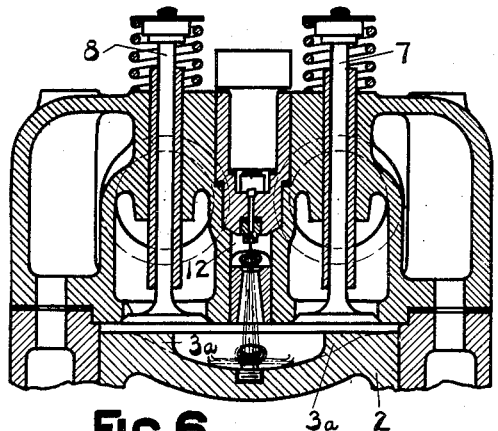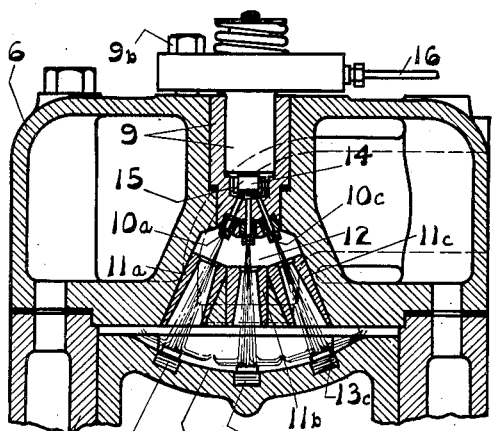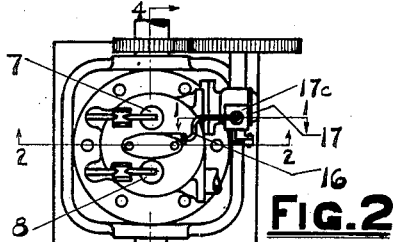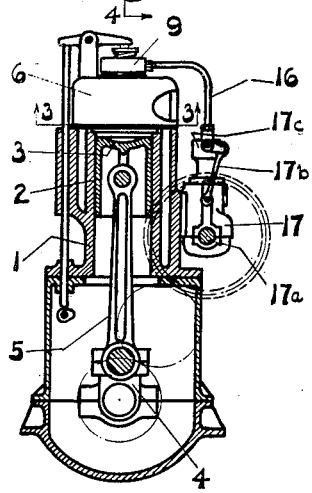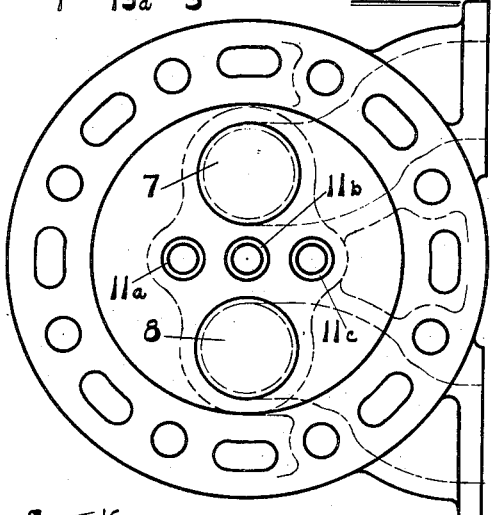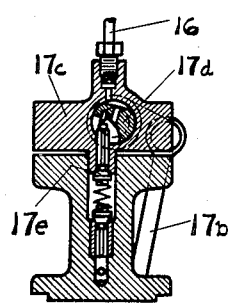

Jan. 13, 1925. 1,522,520
L. ILLMER
INTERNAL COMBUSTION ENGINE
Filed Nov. 15, 1922 2 Sheets-Sheet 2

WITNESSES:-
M. E. Alex
W. R. Illmer

INVENTOR:-
Louis Illmer.

Patented Jan. 13, 1925.

1,522,520

UNITED STATES PATENT OFFICE.

LOUIS ILLMER, OF CORTLAND, NEW YORK.

INTERNAL-COMBUSTION ENGINE.

Application filed November 15, 1922. Serial No. 601,086.

*To all whom it may concern:*

Be it known that I, LOUIS ILLMER, a citizen of the United States, and a resident of Cortland, in the county of Cortland and State of New York, have invented certain new and useful Improvements in Internal-Combustion Engines, of which the following is a specification.

My invention relates particularly to direct injection or so-called airless injection fuel oil engines, and has for its object the increase of efficiency and power output of this class of Diesel engines by means of improved construction in the combustion chamber and in the arrangement of the injection nozzles which feed the fuel to said chamber.

The present invention embodies the use of a plurality of high velocity jet nozzles served from a high pressure liquid fuel injecting means so as to give the jets a high degree of penetration into the compressed air and still provide for a limited jet divergence that is required for effective atomization of the fuel. These jets are then made to impinge against different portions of a hot working part of the engine for the purpose of pulverizing the liquid fuel and properly distributing same throughout the air available for combustion.

An important object of the present invention is to obviate the need for a separate vaporizer chamber; instead, a unitary combustion chamber is employed so that the entire centralized body of air may readily be made to mix with and efficiently support the maximum possible of injected fuel. A further feature resides in the spaced relation between the nozzle orifice and the part against which its jet of fuel is intended to impinge, since this serves to promote the proper carbureting of said body of air without recourse to an air-blast for fuel injection purposes. In the case of air-blast injection, such spacing of the nozzle is not essential because the high pressure air gives the liquid fuel the necessary penetration for proper distribution and at the same time serves to blow away any liquid that may otherwise tend to accumulate at the point of jet impact.

I preferably attain this end in the case of direct injection methods by the use of a dished shape piston crown against which I direct a plurality of nozzle jets in such fashion as to produce substantially similar results without requiring an air-blast. In this improved type of engine, the unitary combustion chamber is preferably confined to the space formed between the dished portion of the piston crown and the flat base wall of the cylinder head that encloses the cylinder bore. The plural nozzles are radially disposed with respect to the cylinder axis and placed at a considerable distance from the dished piston crown so as to afford ample opportunity for the jets to diverge or spread out somewhat before impinging upon different portions of the crown, all of which promotes rapid and complete combustion.

These spaced nozzle jets are made to project or shoot unobstructedly through separate cone-shaped spacer tubes adapted to provide suitable clearance space about the jet divergence and through which the unitary combustion chamber is fed with liquid fuel. Between the issuing point of the jet and the contracted end of the spacer tube, I provide a scavenging cavity maintained at equalized pressure with respect to the said chamber and this serves to store a minor portion of the air in said cavity during the compression stroke for the purpose of cleansing the spacer tube during each power stroke of the piston.

The present invention further embodies improvements in co-ordinating the required valve and jet nozzle parts with respect to the engine structure, and also comprises various other features of organization, all of which will be set forth hereinafter and more particularly pointed out in the appended claims.

Reference is had to the accompanying two sheets of drawings which illustrate an example of the preferred form of my invention; like reference numerals refer to like parts throughout the several views, and in which drawings:

Fig. 1., represents an elevational view in section of a single acting four stroke oil engine equipt with my improvements.

Fig. 2., is a top or plan view of Fig. 1.

Fig. 3., illustrates a sectional detail of the fuel control or timing valve of the fuel injecting means as taken along line 1—1 of Fig. 2.

Fig. 4., is a partial elevational view of the cylinder head and piston taken in section along the line 2—2 of Fig. 2.

Fig. 5., is a bottom view of the cylinder head shown in Fig. 4., as taken on the line 3—3 of Fig. 1.

Fig. 6., is a partial elevational view of the cylinder head and piston taken in section along the line 4—4 of Fig. 2.

Fig. 7., represents an enlarged detail of the nozzle plug used in Fig. 4.

Figure 8:
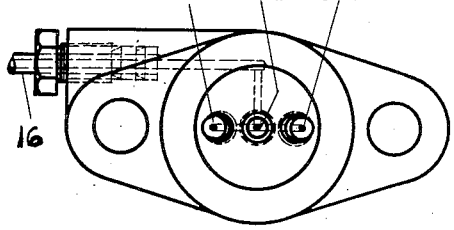

Fig. 8., is a bottom view of the plug shown in Fig. 7.

Figure 9:
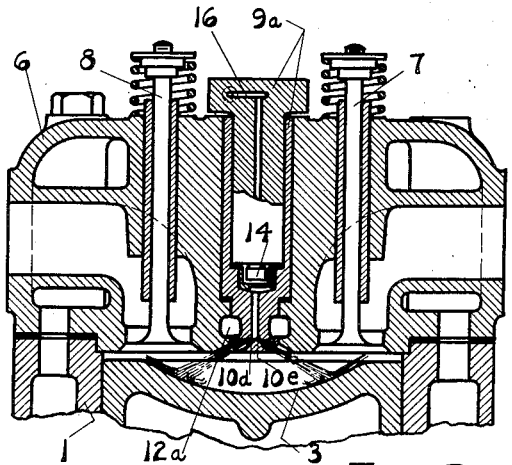

Fig. 9., is a sectional view of a cylinder head similar to Fig. 4., but illustrating a modified form of my invention as applied to an oil engine of large capacity.

Figure 10:
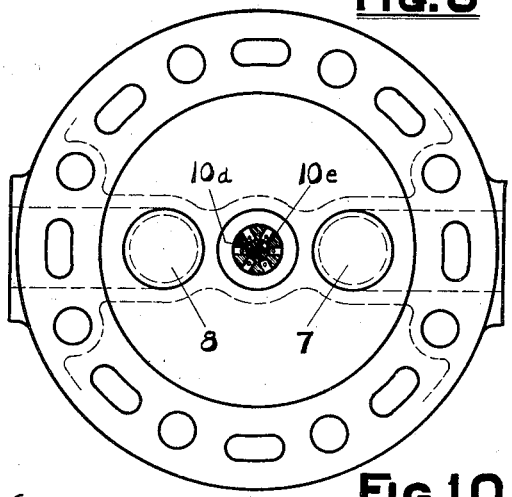

Fig. 10., is a bottom view of the head shown in Fig. 9.

Figure 11:
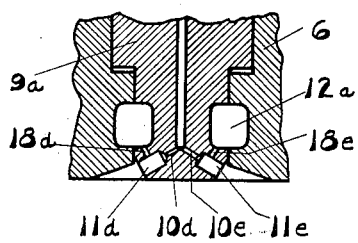

Fig. 11., is an enlarged sectional detail of the multiple jet nozzle used in Fig. 9.

In the particular four-stroke oil engine shown, air is sucked into the cylinder in the usual manner and when the piston reaches the end of its compression stroke the air will have reached ignition temperature whereupon, liquid fuel is injected into the heated air, causing the power impulse to drive the piston forward in the conventional manner.

Referring first to Figs. 1 to 5., the numeral 1 represents the cylinder which is provided with a piston having a skirt portion 2 and a dished crown portion 3. The piston is reciprocated from the crankshaft 4 by means of the connecting rod 5. The cylinder bore is enclosed with a water-jacketed head 6 in which the intake valve 7 and the exhaust valve 8 are parallelly mounted with respect to the cylinder axis. These valves are mechanically operated from a camshaft in the usual manner.

The spindle axes of the valves 7 and 8 are preferably disposed to open normally with respect to the flat bottom face of the cylinder head 6 and are suitably spaced to admit of inserting the nozzle plug 9 between said valves. As shown in Fig. 4, the plug 9 is arranged for a plurality of nozzle tits such as 10ᵃ, 10ᶜ etc., and as is shown in detail in Fig. 7, these tits are preferably drilled with a small plain jet hole through which the liquid fuel is forced at high velocity during the period of fuel injection. The small orifice is kept to a short length by means of an enlarged countersunk hole drilled in the rear threaded portion of each tit where they screw into the plug 9. These nozzles are purposely set well back and away from the dished piston crown against which they impinge since I have found this provision to be conducive to proper initial spreading of the jet and that it leads to improved pulverization and distribution of the liquid fuel. The several inclined nozzles are disposed to discharge in diverse directions and toward different portions of the dished piston crown.

Mounted concentric with the axis of each such nozzle jet is an open flared spacer tube such as 11ᵃ, 11ᵇ, etc., which are intended to have sufficient clearance about the diverging jet to admit of unobstructedly passing the jet through same and without striking the tube walls. It is preferred for best results that the diverging jets be prevented from coming into contact with the surrounding tube parts, since this would result in a precipitation of liquid fuel thereon which could no longer be efficiently consumed in the engine cylinder. These tubes are preferably made separate from the cooled head walls for the purpose of allowing them to assume a relatively higher temperature. In Fig. 4, the tubes are shown as driven into the inclined holes drilled in a plane normal to that of the parallel spindles of the valves 7 and 8, the metal of the cylinder head being flared and made to surround said tubes for this purpose. The inserted tubes are shown cut flush with the flat bottom face of the cylinder head and extend back radially in alignment with their respective nozzle tit axes. It will be seen that the inserted spacer tubes are shortened somewhat so that their interconnected drilled holes in the head wall may serve to form a common scavenging cavity 12.

This enlarged cavity formed in said drilled holes and behind the contracted end of said flared tubes in close proximity to said nozzle tits, is purposely kept reasonably small but, is intended to have a volume sufficient to sweep out said spacer tubes and cleanse same during the expansion stroke of the piston. The inclined drilled hole essentially constitutes a cul-de-sac or blind-ended duct extending off from the unitary combustion chamber, the mouth or open end thereof being the sole outlet for said duct. The tapered spacer tube means may either be inserted into the duct mouth or formed integral with the head wall so as to separate said duct into a scavenging cavity 12 formed bodily behind the small end of said tube bore, it being expedient for best results that the cross-sectional area of said cavity be recessed or otherwise made larger than that of the contracted end of the tube bore into which it feeds. The free open communication afforded by the intermediate space tube, serves to maintain said scavenging cavity at substantially chamber pressure at all times. This cavity is intended to be so disposed with respect to the nozzle, that the air therein may be penetrated by the jet without perceptibly saturating same with fuel, to the end that fresh air may be made to cleanse or sweep out into the combustion chamber all such supersaturated air that may form in the spacer tube because of projecting a diverging fuel jet longitudinally through said duct.

At such points where the various nozzles are intended to impinge upon the dished piston crown, raised deflector lugs such as 13ᵃ, 13ᵇ, etc., may be used and if desired these lugs may be beveled or otherwise made to divert some of the impinging jet in such direction as will secure the best possible distribution of liquid fuel throughout the body of compressed air lying within the primary combustion chamber as formed over the piston crown. The said lugs may also be made to lift the spreading liquid off the dished crown face so as better to direct the fuel into the surrounding compressed air.

In a four-stroke engine in which the plural nozzles are disposed in a single plane as shown in Fig. 4., it is expedient to crowd the air into alignment with the nozzle axes. To attain this end, the dished shape of the crown is not made fully symmetrical about the piston axis but instead a portion is filled in as indicated by $3^a$ in Fig. 6., whereby the air content lying under the two valves 7 and 8, and that outside of the direct range of said nozzles, is reduced to a minimum.

The liquid fuel is supplied to the nozzles by the airless injecting means 17 which may be of any suitable type capable of properly injecting the fuel into the cylinder under high pressure. It is preferred however, to employ an impulsion fuel pump similar to that more fully described in my co-pending patent application No. 229,556 filed April 19, 1918 since this maintains the desired high velocity in the jet nozzle without recourse to an air blast for fuel injection purposes.

The drive-shaft $17^a$ of a pump of this kind may be driven at half crankshaft speed by means of a train of reduction gears as indicated in Fig. 1. From the shaft $17^a$, an eccentric operates the push rod $17^b$ which in turn oscillates the rock-shaft $17^c$ mounted in the valve block $17^e$. As shown in detail in Fig. 3., the rockshaft is provided with a lip that periodically engages with the stem of the inverted discharge valve $17^e$ to mechanically open same against the pressure in the pump chamber. The valve $17^e$ discharges into the conduit 16 which delivers the high pressure fuel to the nozzle block 9, and thence through drilled passages to the plural nozzles $10^a$, $10^b$, and $10^c$, as shown in Fig. 7.

The positively opened discharge valve $17^e$ controls the fuel delivery into the receiving end of the conduit 16 and therefore times the instant at which liquid fuel is allowed to inject into the engine cylinder. It is pointed out that the use of such control remote from the nozzle eliminates the need for further actuating mechanism within the already crowded plug 9, and this simplification in structure constitutes an important advantage of the present invention.

At the discharge end of the conduit 16 and in close proximity to the nozzles a check valve 14 is provided, which prevents the cylinder compression from blowing the liquid fuel back toward the fuel pump. As shown in Figs. 4 and 7., the plug 9 is drilled with a series of holes discharging to the several nozzle tits $10^a$, $10^b$, and $10^c$, all radiating from the single check valve 14 which is thus made to serve the several nozzle tits.

In addition, the head of the vertical check valve 14 is surrounded by a trap cup 15 which serves to trap the liquid fuel so as to keep the valve head sealed for the purpose of maintaining a solid column of liquid to the nozzle tits. The exterior of the cup as well as the bottom wall of same is provided with an overflow recess $15^a$ which then feeds the liquid through small passages leading to the various nozzle tits. Since the outlet $15^a$ cannot in any case drain the inside of the cup, this serves to prevent the formation of an air pocket under said check valve. This detail assumes importance from the fact that in airless injection engines of the type described, the feed passages must be kept free from pocketed air.

It will be seen that the nozzle tits $10^a$, $10^b$, etc., are separately inserted into the removable plug 9 to allow of easy repair. The plug is further fashioned in two separate parts to afford access to the check valve 14, the plug as a whole being held in place against the cylinder head seat by means of flange studs such as $9^b$.

Assuming now that the piston has just reached its outer dead-center position, the inlet valve 7 will then have filled the cylinder with a charge of air. During the next or compression stroke, this air will be pressed into the unitary combustion space lying directly above the dished piston crown while at the same time a minor portion of this air will also be forced through the several spacer tubes $11^a$, $11^b$, etc., and thus deposited into the scavenging cavity 12. In the mean time this compressed air will have reached the ignition temperature of liquid fuel.

At this instant, the fuel injecting means 17 will have opened its discharge valve $17^e$ whereby to allow a measured charge of high pressure liquid fuel to enter the conduit 16 which then sends same forth to the multiple jet nozzles $10^a$, $10^b$ etc. The check valve 14 is automatically opened and the liquid fuel jets issuing from the tits $10^a$, $10^b$, etc., at high velocity but without marked spray action are thereby projected directly through the common scavenging cavity 12, and thence through the several unobstructed spacer tubes $11^a$, $11^b$, etc., whereupon the respective jets are made to penetrate the unitary body of air confined within the combustion chamber and to impinge on different portions of the hot dished piston crown. This action causes the liquid to burst into a fine state of pulverization and uniformly mix with the chamber air.

It will be seen that the described plural nozzles working in conjunction with suitable spacer tubes greatly facilitates the uniform distribution of the fuel and prevents any abnormal concentration of liquid fuel at any one point of the piston crown; in addition, this method also allows of the use of a lower nozzle pressure since the required spreading effect may be reduced somewhat in proportion to the number of nozzles used. The number and angular disposition of the multiple nozzles and spacer tubes therefor, is to be such as to secure the best possible distribution of the atomized liquid throughout the available air without having to resort to excessively high nozzle pressures or an abnormally small orifice.

Another advantage of the described mode of airless fuel injection lies in the fact such jet nozzles posses a high degree of penetration into the compressed air whereby the liquid fuel may readily be projected through such minor portion of air as lies in the cul-de-sac duct and made to lodge within and thoroughly mix with the major body of air that is confined within the unitary chamber where combustion is primarily intended to take place.

I have found that the projecting of liquid fuel jets through unscavenged spacer tubes tend to cause the compressed air therein to become supersaturated with fuel. The purpose of the scavenging cavity 12 is to cleanse such spacer tubes after each explosion and to provide for an augmented supply of fresh air for such fuel as may be deposited in said tubes during the injection period. This scavenging action is most pronounced during the initial outward travel of the piston when the compressed air in the scavenging cavity 12 is allowed to expand rapidly through the several nozzle tubes 11ª, 11ᵇ, etc., and this serves to sweep said supercharged air into the major portion of air lying over the dished piston crown, where such excess liquid fuel may readily be burned efficiently.

It will be seen therefore that although ignition of the injected liquid fuel may occur while the jet is passed through its spacer tube, the combustion primarily takes place over the hot piston crown in a manner similar to that of the full Diesel engine as served by an air blast injecting means. In the present invention, however, the need for a high pressure air compressor is obviated and no mechanically operated fuel nozzle is required since the timing of the fuel injection is here placed under the direct control of the pump discharge valve 17ᵉ.

As previously indicated, the number of nozzles required for proper distribution of the liquid fuel throughout the cylinder air charge is dependent upon the size of the engine and upon the pressure used behind the jet nozzle. In the case of smaller cylinder bores, a single nozzle tit when set in alignment with the cylinder axis such as 10ᵇ co-acting with the single spacer tube 11ᵇ will suffice to attain the desired results. With enlarged cylinder bore dimensions it is advisable to increase the number of jets proportionally and for engines of large capacity where the distance between the nozzle tit and the point at which it impinges against the piston crown inherently becomes large, it is preferred to modify the arrangement shown in Fig. 4, and then work in the manner indicated in Fig. 9.

In the latter construction, the plural jet nozzles such as $10^d$, $10^e$, etc., are radially disposed about the cylinder axis and are intended to be kept at sufficient distance from the piston crown to provide for the desired nozzle divergence or spreading action before impinging thereon. In such instances, a reduced scavenging effect may be resorted to for the spacer tubes and it may be preferred to undercut the nozzle plug $9^a$ so as to form the concentric scavenging cavity $12^a$ as shown in Fig. 11. It will be seen that the common cavity $12^a$ communicates with the individual spacer tubes $11^d$, $11^e$, etc., by means of small holes such as $18^d$, $18^e$, etc., thus providing for scavenging the reduced spacer tubes in a manner similar to that previously described in connection with Fig. 4.

When using a centralized nozzle constructed in accordance with Fig. 9, it is preferred to strike the piston crown at a slant rather than squarely as in the case of smaller engines, the effect of which is to produce a fantail flare to the impinging jet which likewise serves to effect an even distribution of the liquid throughout the available air charge.

It will be apparent that while my improvements have been shown as applied to four-stroke oil engines, the same underlying principles are equally applicable to two-stroke engines, and because of the absence of the intake and exhaust valves in the cylinder head, this allows of a more symmetrical placing of the spacer tubes about the cylinder axis.

It is also pointed out that the deflector lugs 13 against which the jet impinges is not essential to the proper operation of the described fuel injection devices. Furthermore results similar to those described may also be obtained by the use of a flat piston crown working in conjunction with a dished cylinder head wall. It will be understood therefore that I do not wish to be limited to the particular construction set forth since various changes in structure and co-ordination may be resorted to without departing from the spirit and scope of the present invention, heretofore described and more particularly set forth in the appended claims.

Claims:

1. In an internal combustion engine comprising a liquid fuel injecting means of the airless type, a unitary combustion chamber, a piston adapted to compress an air charge into said chamber, a duct serving to feed fuel to said air, a nozzle spaced from the piston and adapted to unobstructedly project a diverging jet of fuel through said duct and against the piston crown, a spacer tube means for said duct adapted to provide clearance around said jet divergence, and a scavenging cavity formed in an enlarged portion of said duct and disposed between said tube and the nozzle, said cavity being maintained at substantially chamber pressure through said tube.

2. In an internal combustion engine comprising a liquid fuel injecting means of the airless type, a unitary combustion chamber, a piston adapted to compress an air charge into said chamber, a duct serving to feed fuel to said air, a nozzle spaced from the piston and adapted to unobstructedly project a diverging jet of fuel through said duct and against the piston crown, a spacer tube means for said duct having a bore flaring outwardly toward its fuel discharge end and adapted to provide clearance about said jet divergence, and a scavenging cavity for said duct bodily disposed between the contracted end of the tube bore and the nozzle.

3. In an internal combustion engine comprising a liquid fuel injecting means of the airless type, a unitary combustion chamber, a piston adapted to compress an air charge into said chamber, a duct serving to feed fuel to said air, a nozzle spaced from the piston and adapted to unobstructedly project a diverging jet of fuel through said duct to impinge against the piston crown, a spacer tube means for said duct adapted to provide clearance around said jet divergence, a scavenging cavity for said duct disposed between said tube and the nozzle, and a deflector lug means for the piston serving to divert the impinging liquid toward the major portion of air confined within said chamber.

4. In an internal combustion engine provided with a liquid fuel injecting means, a unitary combustion chamber, a piston adapted to compress a charge of air into said chamber, a plurality of jet nozzles each directed toward different portions of the piston crown and served by said injecting means, a separate spacer tube for each of said nozzles and through which tubes the respective jets are unobstructedly projected to impinge against the piston crown, and a common intercommunicating scavenging chamber serving to cleanse all of said tubes.

5. In an internal combustion engine provided with a liquid fuel injecting means of the airless type, a unitary combustion chamber, a piston adapted to compress a charge of air into said chamber, a jet nozzle adapted to feed fuel to said air, a spacer tube through which said jet is unobstructedly projected to impinge against the piston, a scavenging cavity bodily disposed between said tube and the nozzle for cleansing said tube, a conduit connecting the injecting means with said nozzle, a non-return check valve commanding the discharge end of said conduit, and control means remote from said nozzle serving to time the fuel delivery into the receiving end of said conduit.

6. In a four-stroke internal combustion engine provided with a liquid fuel injecting engine, a unitary combustion chamber, a piston means, a unitary combustion chamber, a piston adapted to compress a charge of air into said chamber, an exhaust valve and an inlet valve for said head, a nozzle plug mounted between said valves and provided with a jet nozzle tit served from said injecting means, an open spacer tube flaring outwardly towards its discharge end through which said tit unobstructedly shoots liquid fuel against the piston crown, and a scavenging chamber bodily disposed between the nozzle and said tube serving to cleanse said tube.

7. In an internal combustion engine provided with a liquid fuel injecting means of the airless type and comprising a cylinder and a head therefor, a piston adapted to compress a charge of air within said cylinder, a jet nozzle, a conduit connecting the injecting means with said nozzle, a non-return check valve for said conduit adapted to open downwardly, and a trap means for said check valve adapted to maintain a solid column of liquid fuel to said nozzle.

8. In a four-stroke internal combustion engine provided with a liquid fuel injecting means and comprising a cylinder and a head therefor, a unitary combustion chamber, a piston adapted to compress a charge of air into said chamber, an exhaust valve and an intake valve parallelly mounted in said head with respect to the cylinder axis, a nozzle plug mounted between said valves having a plurality of jet nozzles adapted to discharge crosswise to the plane of the valve spindle axes so as to impinge upon different portions of the piston crown, and a separate spacer tube for each of said nozzles.

9. In a four-stroke internal combustion engine provided with a liquid fuel injecting means and comprising a cylinder and a head therefor, a piston having a dished crown and adapted to compress a charge of air within the cylinder, an exhaust valve and an intake valve parallelly mounted in said head with respect to the cylinder axis, a nozzle plug mounted between said valves having a plurality of jet nozzles directed to discharge crosswise to the plane of the valve spindle axes so as to impinge upon different portions of the dished piston crown, and means including a filler lug for the dished piston crown adapted to crowd the charge of compressed air into alignment with said nozzle jets.

10. In an internal combustion engine provided with a liquid fuel injecting means and comprising a cylinder and a jacketed head therefor having a bottom wall enclosing the cylinder bore, a piston having a crown adapted to move into close proximity to said bottom wall and serving to form a unitary combustion chamber therewith, a nozzle plug having multiple jet nozzles radially disposed and adapted to feed said chamber with liquid fuel and a flared head wall cast integral with said bottom wall serving to enclose said radial jets to form separate spacer tubes through which the respective jets are unobstructedly projected to impinge upon different portions of the piston crown.

11. In an internal combustion engine provided with a liquid fuel injecting means of the airless type and comprising a cylinder and a head therefor, a piston adapted to move in close proximity to said head and serving to form a unitary combustion chamber therebetween, a duct feeding fuel to said chamber, a nozzle adapted to unobstructedly project a diverging jet of fuel longitudinally through said duct and against the piston, a spacer tube means disposed at the discharge end of said duct and adapted to provide clearance about said jet divergence, and a scavenging cavity disposed in said duct intermediate the tube and said nozzle.

12. In an internal combustion engine provided with a liquid fuel injecting means of the airless type and comprising a cylinder and a head therefor, a piston adapted to move into close proximity to said head to form a unitary combustion chamber, a plurality of jet nozzles directed toward different portions of the piston crown and served by said injecting means, separate spacer tubes for each of said jets adapted to unobstructedly feed and distribute liquid fuel within said unitary combustion chamber.

13. In an internal combustion engine comprising a liquid fuel injecting means of the airless type, a unitary combustion chamber, a piston adapted to compress a charge of air into said chamber, a cul-de-sac duct extending from said chamber and so disposed that the mouth thereof constitutes the sole outlet of said duct, a timed nozzle spaced from the piston adapted to unobstructedly project a diverging jet of fuel longitudinally through said duct, and means including a scavenging cavity disposed at the blind end of said duct adapted to sweep onward into said combustion chamber by means of a substantially fresh body of air, such surplus fuel as may lodge at the mouth portion of said duct when projecting a diverging fuel jet therethrough.

14. In an internal combustion engine comprising a liquid fuel injecting means of the airless type, a unitary combustion chamber, a piston adapted to compress a charge of air into said chamber, a cul-de-sac duct extending from said chamber and so disposed that the mouth thereof constitutes the sole outlet of said duct and serves to maintain said duct at chamber pressure, a timed nozzle adapted to unobstructedly project a diverging jet of fuel longitudinally through said duct, a scavenging cavity disposed at the blind end of said duct adapted to be penetrated by said fuel jet without perceptibly saturating with fuel the air therein, and means including a spacer tube disposed at the chamber end of said duct adapted to cleanse the mouth portion of said duct while the substantially fresh body of air in said cavity is allowed to expand during the power stroke of the engine.

15. In an internal combustion engine comprising a fuel injection means of the airless type, a unitary combustion chamber, a piston adapted to compress a working air charge into said chamber, a feed duct communicating with and extending from said chamber so disposed that the mouth thereof constitutes the sole outlet of said duct, a timed nozzle adapted to unobstructedly project a jet of fuel through said duct, and a scavenging cavity and spacer tube means for said duct, the last named means serving to maintain a substantially equalized pressure throughout said working charge including that portion of air pressed into said duct, which air portion is disposed between the nozzle orifice and the piston crown so as to lie entirely ahead of said orifice.

In testimony whereof I have hereunto set my hand this 14th day of November, 1922.

LOUIS ILLMER.

Witnesses:
M. E. ALEXY,
W. R. ILLMER.